June 5, 1934. G. F. ZELLHOEFER 1,962,098
AUTOMATIC CONTROL FOR AIR CONDITIONING DEVICES
Filed July 25, 1932
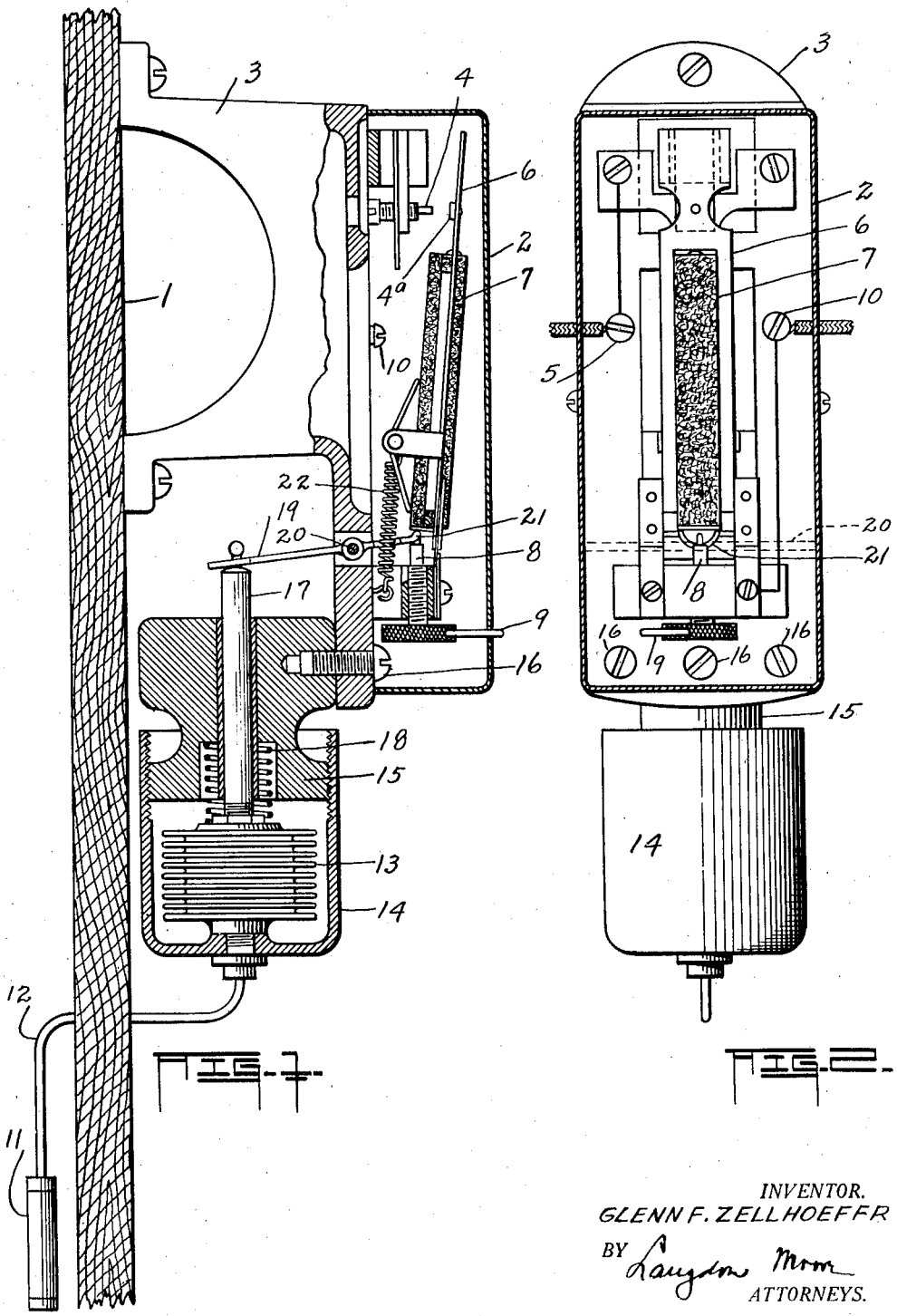
INVENTOR.
GLENN F. ZELLHOEFER
BY
ATTORNEYS.

Patented June 5, 1934

1,962,098

UNITED STATES PATENT OFFICE 1,962,098

AUTOMATIC CONTROL FOR AIR CONDITIONING DEVICES

Glenn F. Zellhoefer, Bloomington, Ill., assignor to Williams Oil-O-Matic Heating Corporation, Bloomington, Ill., a corporation of Illinois Application July 25, 1932, Serial No. 624,461

1 Claim. (Cl. 236—44)

This invention relates to improvements in air conditioning mechanism and more particularly to an automatic control for such mechanism.

It has been found advantageous in dwellings, buildings, and other enclosed spaces to provide and maintain as constant as possible a certain definite amount of moisture in the air contained in such places for the welfare and comfort of individuals occupying such places as well as to prevent the deterioration of articles contained therein from being affected by changes in the humidity above or below the normal degree.

Many devices have been adopted for this purpose including electrically operated mechanism such as an electric fan blower for causing the current of air to pass over or through a moisture producing medium and then delivering such moistened air to various parts of the dwelling, building or enclosure, and the operation of such devices is controlled by what is generally now termed a humidostat. This instrument is placed where it will meet the average air condition of the enclosure and is so constructed that a portion of its operating parts will be directly responsive to the presence or absence of moisture in the surrounding atmosphere, a lack of moisture actuating the instrument to close the electric circuit to the motor and the presence of the desired amount of moisture in the atmosphere will actuate it to break the motor circuit. These devices are commercial structures and may be bought in the open market.

It is an object of this invention to provide an additional control to be connected to such a humidostat which control is actuated by the temperature exterior to the building or enclosure because when the temperature surrounding the building on account of climatic conditions becomes very low with the temperature within the building remaining about normal, a precipitation of moisture upon the panes of glass forming the windows will cause them to first fog and then possibly frost, obstructing the vision from the interior and the entrance of light from the exterior and when the exterior temperature rises, the water resulting from the defrosting of the glass damages the adjacent paint, wood-work or walls and wall covering.

It has been found that thirty percent humidity at seventy degrees Fahrenheit is the minimum humidity that should be maintained within a building and the commercial humidostat in electrically operated air conditioning mechanism, being adjustable as to its operation, should be set at approximately this point. In case the outside temperature drops below 25° Fahrenheit with this room condition moisture will precipitate on the glass of the windows and to eliminate this unsatisfactory condition the humidity of the atmosphere within the room should be reduced. Heretofore this has been accomplished by a manual change of the setting of the humidostat and requires a manual re-setting at each appreciable change of exterior temperature. To maintain the maximum room humidity possible under conditions of low outside temperature without precipitating the moisture on the windows, it is proposed to provide a charged bulb element exposed to the outside temperature which will actuate a mechanism to automatically re-set the humidostat to maintain a lower humidity thereby preventing precipitation of moisture and yet maintain the maximum humidity possible without causing precipitation.

With these and other objects in view, reference is made to the accompanying sheet of drawings illustrating a preferred form of this invention with the understanding that minor detail changes may be made without departing from the scope thereof.

In the drawing;

Figure 1 is a view partly in side elevation and partly in central vertical section of an embodiment of this invention as installed.

Figure 2 is a view in front elevation with the humidostat cover removed.

Since humidostat and electrically operated air conditioning mechanism controlled thereby are well-known articles of commerce, it is not thought necessary to illustrate more than the humidostat with the improved automatic control as contemplated by this invention in order that one skilled in the art may understand the construction and operation thereof.

In Figure 1 the exterior wall of the dwelling, building, or other enclosure is diagrammatically represented by a single thickness of wood indicated by the reference numeral 1 with the understanding that such wall may be of any desired construction. A commercial type of humidostat enclosed in the cover 2 is mounted upon a bracket 3 secured to the wall 1. In this type of humidostat a contact point 4 is provided in fixed relation to the bracket 3 and electrically connected to the binding post 5 adapted to be connected in the circuit to the air conditioning apparatus. A pivoted contact carrying arm 6 is mounted therebelow carrying a complementary contact 4a and disk arm 6 mounts a strip of moisture responsive material 7 which will normally expand as the amount of moisture in the surrounding atmosphere increases and contracts as the said moisture decreases. The strip is mounted as shown so that the end adjacent the pivot of the arm may reciprocate in response to a change of moisture conditions and the exterior of this end of the strip 7 is so arranged as to contact an adjustable abutment 8 which may be manually adjusted by the pin or lever 9 in such a manner that when the humidity of the atmosphere reaches a certain pre-determined degree the strip 7 will expand sufficiently to engage the abutment and upon further expansion will cause the arm 6 to swing about its pivot and separate the contacts 4 and 4a. The lower end of this arm 6 is electrically connected to the binding post 10 adapted to be connected in circuit with the air conditioning apparatus. When the humidity decreases below a certain pre-determined degree, the element 7 contracts and allows the contacts 4 and 4a to be engaged and thereby complete the circuit to the humidifying apparatus. This instrument so far described is typical of the commercial humidostat.

This invention contemplates the provision of the bulb 11 charged with a volatile liquid such as dichlorodifuromethane (boiling point—22° C.) which bulb is suitably mounted in any desired manner upon the exterior of a metallic bellows 13, the lower end of which is fixedly mounted within a chamber 14 preferably screw-threaded about a plug 15 which is preferably affixed to the base of the above described humidostat by the screw 16. A vertically reciprocal rod 17 is provided, the lower end of which is secured to the upper closed end of the bellows 13. The plug 15 is preferably screw-threaded within the chamber 14 as shown for adjusting the relation of the parts. It is also preferable to arrange a coil spring 18 about the lower end of the rod 17 received within a recess provided therefor in the bottom of the plug 15 and bearing upon the upper closed end of the bellows 13. The upper end of the rod 17 is provided with a sliding connection with one end of an adjusting lever 19 pivotally mounted at 20 to the base of the humidostat which lever extends therebeyond and is terminated in bifurcated arms 21 passing on either side of the abutment 8 and adapted to be engaged by the lower exterior end of the member 7. In this particular instance it is preferable to provide the spring 22 which normally exerts a pull upon the pivoted arm 6 to hold the contacts 4 and 4a in engagement with each other.

The bulb 11 is preferably charged with a small amount of the volatile liquid so that at high temperatures, approximately 60° Fahrenheit, all of the liquid is vaporized and higher temperatures will therefore not cause an excessive pressure on the bellows 13. The spring 18 acts against the pressure of the vapor in the bellows. The adjustment of this spring tension such as by the rotation of the plug 15 within the chamber 14, determines the temperature at which the pressure against the member 7 of the humidostat is exerted by the adjusting lever 19 and rod 17 and with this adjustment makes possible the cutting out of the humidostat control by the charged bulb element at any desired outside temperature for any given interior humidity.

What I claim is:

A control for an electrically operated humidifying device for buildings including a switch in the operating circuit within the building having a fixed contact and a movable contact, an arm pivoted therebelow carrying the movable contact, a moisture responsive element carried on said arm and held at one end thereof with the other end free to move as the element expands or contracts in accordance with the moisture content of the surrounding air, an adjustable abutment adapted to be engaged by the free end of said element, a spring acting to rotate the arm about its pivot in the direction of the fixed contact and maintaining the engagement of the free end of said element against the abutment, said abutment including an adjustable stud and a pivoted temperature actuated lever having one end interposed between said stud and free end of said moisture responsive element, a hollow contractible and expansive member fixed at one end and mounting a reciprocable rod on the movable end having an operating connection with the free end of said pivoted lever, and a bulb located exterior of the said building connected to the interior of said contractible and expansive member containing a substance responsive to temperature changes to contract or expand said member, whereby contraction of said member delays the closing of the switch.

GLENN F. ZELLHOEFER.